March 11, 1930.  G. W. ROSSO  1,750,054
TRANSPLANTING MACHINE
Filed April 25, 1928   2 Sheets-Sheet 1
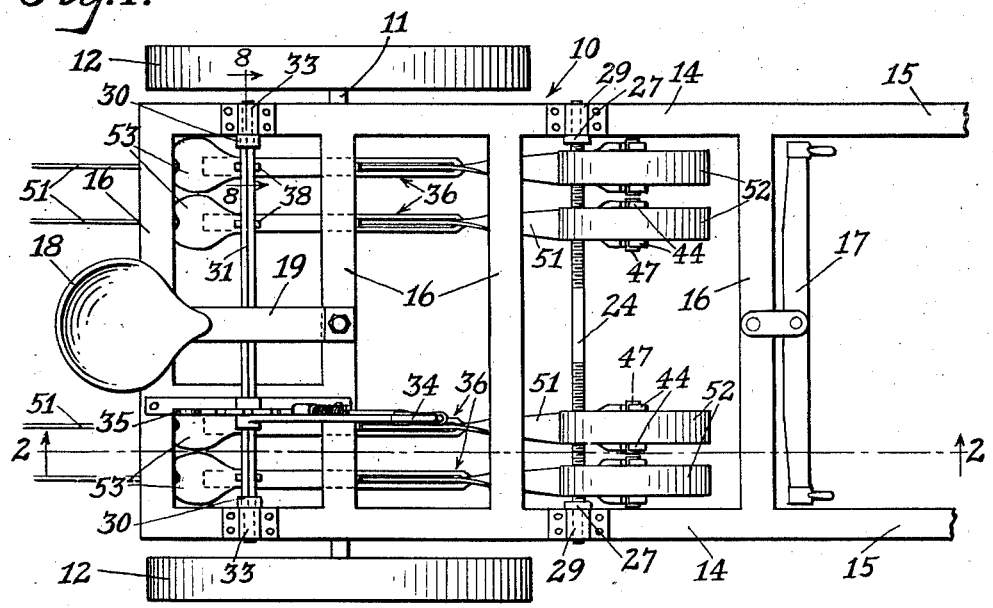
Fig. 1.
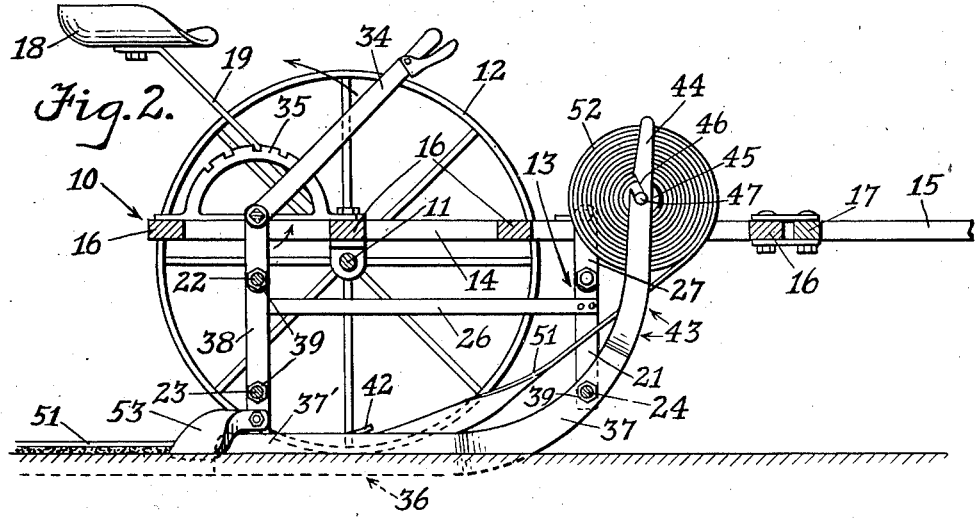
Fig. 2.
Fig. 9.
INVENTOR,
George W. Rosso
BY
ATTORNEY.

March 11, 1930.   G. W. ROSSO   1,750,054
TRANSPLANTING MACHINE
Filed April 25, 1928   2 Sheets-Sheet 2
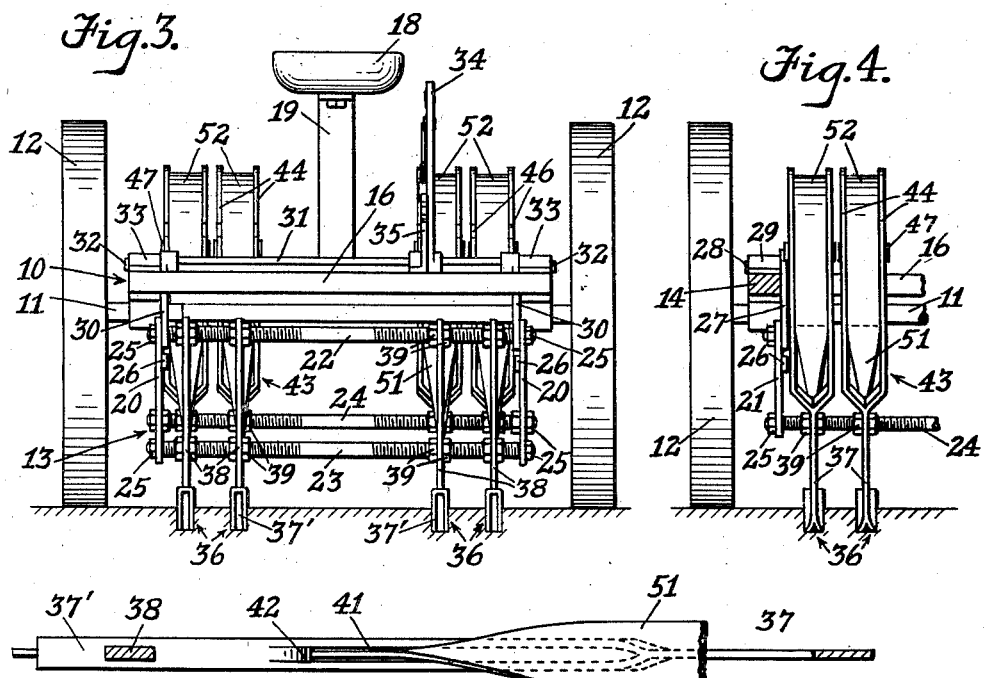
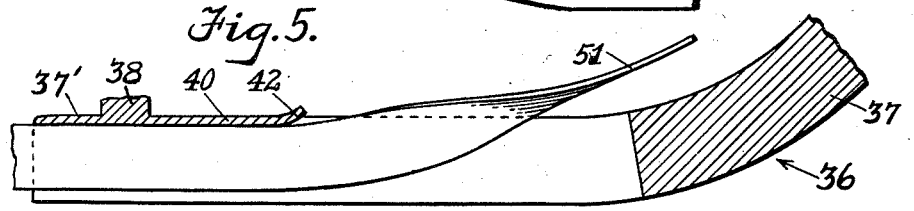
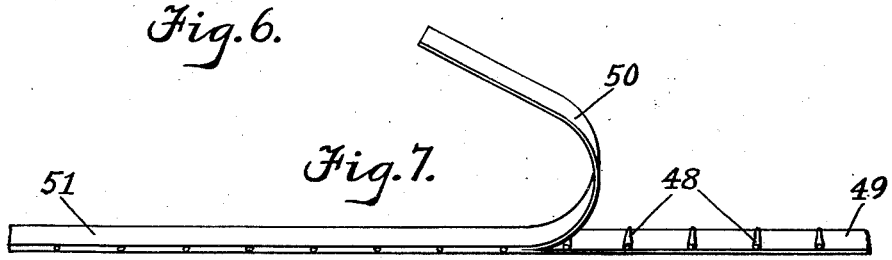
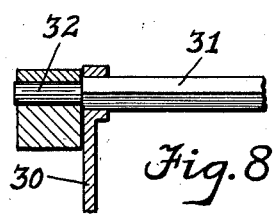
INVENTOR,
George W. Rosso
BY A. K. Martell
ATTORNEY.

Patented Mar. 11, 1930

1,750,054

UNITED STATES PATENT OFFICE

GEORGE W. ROSSO, OF LOS ANGELES, CALIFORNIA

TRANSPLANTING MACHINE

Application filed April 25, 1928. Serial No. 272,763.

My invention relates to farming or gardening machinery and more particularly to a machine for transplanting vegetable plants, such as onions, tomatoes, cabbages and the like.

The primary object of my invention is to provide a machine whereby small plants may be set out in spaced rows with exceptional speed and at a relatively small cost for labor.

A further object is to provide a transplanting machine which is comparatively simple in construction and which readily may be operated by one person.

A further object is to provide a transplanting machine which readily may be adapted for different uses, such as harrowing, cultivating and the like.

Other objects and advantages will appear hereinafter and while I show herewith and will describe a preferred form of construction, I desire it to be understood that I do not confine my invention to such preferred form but that various changes and adaptations may be made therein without departing from the spirit of my invention as hereinafter claimed.

Referring to the drawings which accompany this specification and form a part thereof, Fig. 1, is a plan view of a transplanting machine embodying the principles of my invention.

Fig. 2, is a sectional view of the machine shown in Fig. 1, the section being taken on line 2—2 of that figure.

Fig. 3, is a rear view of the machine shown in Fig. 1, without the covering shoes.

Fig. 4, is a fragmentary front view of the machine shown in Fig. 3, showing certain right-side parts thereof.

Fig. 5, is an enlarged plan view of one of the runners or furrowing shoes of my transplanting machine.

Fig. 6, is a vertical sectional view of the runner shown in Fig. 5, the section being taken in a longitudinal direction.

Fig. 7, is an illustrative view in perspective of a section of the plant-carrying band or ribbon, used in connection with my transplanting machine.

Fig. 8, is a enlarged sectional detail view of frame parts of my machine taken on line 8—8 of Fig. 1.

Fig. 9, is an enlarged view in perspective of one of the covering shoes used with my transplanting machine.

It will be seen that the machine shown in the drawings, by way of illustration, is designed to transplant four rows at a time, and is intended to be drawn by one horse. This particular type of machine consists of a fixed frame 10 supported by an axle 11 upon the ends of which wheels 12 turn, so as to form a two-wheeled cart, and a movable frame 13, mounted in said fixed frame so as to be adjustable therein, said movable frame having the transplanting mechanism attached thereto, as presently will appear.

Fixed frame 10 is formed of side bars 14, the forward ends of which terminate in shafts 15, and transverse tie-bars 16 which hold said side bars in spaced relation to each other. A single-tree 17 is attached to the forward one of said transverse bars 16, and a seat 18, mounted on a spring bar 19, is attached to one of the intermediate tie-bars 16.

Movable frame 13 is formed of a pair of longer vertical bars 20, at the rear end, and a pair of shorter vertical bars 21 at the front end thereof, with round upper and lower transverse bars 22 and 23 respectively, extending through said longer vertical bars and a similar transverse bar 24 extending through the lower ends of said shorter vertical bars. Both ends of transverse bars 22, 23 and 24 are screw-threaded well toward their middle points and nuts 25 are turned on the ends thereof to hold vertical bars 20 and 21 in place. Longitudinal tie-bars 26, extending between said vertical bars 20 and 21 on each side of the movable frame, are attached thereto adjacent their upper ends.

The front end of the movable frame is supported in the fixed frame by links 27 the lower ends of which are pivotally attached to the upper ends of vertical bars 21 and the upper ends of which are equipped with pivot pins 28 which turn in bearings 29, attached to side bars 14 on each side of the fixed frame. The rear end of the movable frame is supported by crank arms 30, the lower ends of which turn on upper transverse bar 22, just within vertical bars 20, and the upper ends of which are equipped with square apertures through which a square transverse shaft 31 extends, said shaft having rounded ends 32 which turn in bearings 33, similar to bearings 29 and similarly attached to side bars 14. A hand lever 34, adapted to turn said shaft 31, is mounted thereon, said hand lever being equipped with the usual spring latch and notched sector 35, for retaining it in different positions, as is clearly shown in Fig. 2.

A series of furrow shoes or channeled runners 36, having relatively sharp upturned forward ends 37 adapted to cut through the soil, and vertical arms 38 fixed thereto, adjacent their rear ends, are mounted in parallel spaced relation to each other in movable frame 13, transverse bars 22 and 23 extending through apertures in arms 38 and transverse bar 24 extending through apertures in up-turned ends 37 of the runners. Clamping-nuts 39 are turned on transverse bars 22 and 23 against uprights 38 and on transverse bar 24 against runner parts 37, as shown in Figs. 3 and 4, the several runners thus being held rigidly in their adjusted positions.

The runner blade is expanded rearwardly from its up-turned end to form a relatively deep and narrow inverted channel 37', as is clearly shown in Figs. 3, 5 and 6. A portion of the upper wall 40 of the channel is cut away to provide a relatively long slot 41, between up-turned end 37 and vertical arm 38 of the runner, and a short section of said wall 40 is cut loose and bent upwardly to form a guide-tongue 42 at the rear end of slot 41. The up-turned forward end of each runner is equipped with a relatively long fork 43, with parallel branches 44 adapted to support a spool 45 between them, notches 46 being cut in said branches 44 to receive pivot pins 47 on which the spool turns about an axis at right angles to the runner.

The plants which are to be transplanted by the machine thus constructed must be arranged beforehand in suitable form to be wound on spools 45 and this is done in the manner illustrated in Fig. 7. The individual plants 48 are laid at spaced intervals, corresponding to the proper spacing thereof in the row, on strips of paper 49, preferably cut from old newspapers, or other suitable material, and similar strips 50 are laid over them, enough paste being used between the upper and lower strips to cause them to adhere sufficiently to hold the plants in place and to form a continuous band or ribbon 51. This ribbon is wound on one of the spools 45 as the work proceeds until a roll 52 of convenient size for handling is obtained.

When the operation of planting is about to begin a roll 52 is placed in each of the forks 43 and the free end of the plant-carrying ribbon is guided downwardly and backwardly through slot 41 into the runner channel and outwardly through the rear end thereof, the ribbon being twisted slightly between the spool and the slot in a direction to cause the plants to stand upright, it being understood, of course, that the root ends thereof are all laid one way and the top ends the other when the ribbon is being formed. The free end of the ribbon finally is fastened to a stake or other holding device (not shown) at the end of the row, and as the machine is driven across the field, rolls 52 unwind automatically, sufficient friction being provided in the spools to keep the ribbon taut.

It is evident from the description that as the machine is drawn across a properly prepared field runners 36 cut narrow furrows in the soil and that the plant carrying ribbons are strung along therein in such a manner that the plants are held upright in spaced rows. Covering shoes 53, of the general form shown in Fig. 9, which are adapted to pull the loosened soil from the sides toward the center of the furrow against the ribbon and around the plants, are attached to the rear ends of the runners as shown in Figs. 1 and 2.

The depth of the furrows is such that the tops of the plants project somewhat above the ground level, such depth being regulated by operating lever 34 to raise or lower movable frame 13. It is evident that lever 34 is also adapted to lift movable frame 13 high enough to raise and hold runners 36 several inches above the ground surface when the machine is being driven to and from the field.

The ribbon, of course, is left with the plants in the furrow and serves to protect them against frost and insects until they have taken root and grown somewhat. Furthermore the material of which the plant-carrying ribbon is made may be of such a character as to serve as a fertilizer to the young plants, after having fulfilled its original purpose.

While I have shown and described a transplanting machine adapted for setting out four rows of plants at a time, it is obvious that smaller machines adapted for setting out one or two rows or larger machines adapted for setting out six or more rows, and having the same general features, readily may be built. Obviously too, various attachments for converting the machine to other uses may be substituted for the covering shoes shown.

I therefore claim as my invention:

1. A transplanting machine comprising a fixed frame, forming part of a two-wheeled vehicle; a movable frame mounted in said fixed frame so as to be adjustable in relation thereto; a channeled runner attached to said movable frame said runner being adapted to cut a furrow in the soil, a spool on said movable frame, turnable about a horizontal axis, said spool being adapted to carry a ribbon wound thereon in which plants are fixed at regular intervals, and means on said movable frame for guiding said ribbon from said spool into the furrow cut by said runner when one end of the ribbon is held fast at one end of the furrow, as the machine is driven across a field.

2. A transplanting machine comprising a fixed frame, forming part of a two-wheeled vehicle; a movable frame mounted in said fixed frame and pivotally attached thereto; lever means on said fixed frame for raising and lowering said movable frame in relation thereto; a channeled runner attached to said movable frame, said runner being adapted to cut a furrow in the soil and being provided with a longitudinal slot cut through the upper wall thereof; a spool mounted on the forward end of said runner, said spool being adapted to hold a ribbon wound spirally thereon in which plants are fixed at regularly spaced intervals, and means on said movable frame for guiding the ribbon from said spool into said channeled runner through said slot therein, when one end of the ribbon is made fast at one end of the furrow cut by said runner, as the machine is driven across a field.

3. In a transplanting machine having two wheels turning on an axle, a frame fixed to said axle; a movable frame mounted in said fixed frame so as to be adjustable vertically therein; a series of channeled runners attached to said frame in spaced relation to each other, said runners being adapted to cut parallel furrows in the soil and each runner being provided with a longitudinal slot cut through its upper wall, which slot coincides in width with the channel thereof, so as to form a continuous passage vertically and rearwardly through the runner, a forked support fixed to the front end of each of said runners and a spool mounted in each of said forked supports so as to turn about a horizontal axis in transverse relation to the runner, said spool being adapted to carry a ribbon wound thereon, in which plants are fixed at regularly spaced intervals, so that when the end of the ribbon is led through said passage in the runner and is fixed at the end of a furrow, said spool will feed it into the furrow as the machine is driven across a field.

GEORGE W. ROSSO.